United States Patent [19]
Scheelen

[11] Patent Number: 6,002,297
[45] Date of Patent: Dec. 14, 1999

[54] DIGITAL FILTER

[75] Inventor: Jos Scheelen, Mol, Belgium

[73] Assignee: British Technology Group Inter-Corporate Licensing Limited, London, United Kingdom

[21] Appl. No.: 09/015,304

[22] Filed: Jan. 29, 1998

Related U.S. Application Data

[63] Continuation of application No. PCT/GB96/01871, Jul. 31, 1996.

[30] Foreign Application Priority Data

Aug. 2, 1995 [GB] United Kingdom ............... 9515842

[51] Int. Cl.$^6$ ..................................................... H03K 5/00
[52] U.S. Cl. ........................... 327/556; 327/552; 327/47; 364/724.16; 375/350
[58] Field of Search .................. 322/39, 40, 552, 322/559, 47, 556; 364/724.16; 375/350

[56] References Cited

U.S. PATENT DOCUMENTS 4,325,030 4/1982 Xolamonico ............... 327/39
5,271,039 12/1993 Suzuki .

FOREIGN PATENT DOCUMENTS 2 573 589 5/1986 France .

OTHER PUBLICATIONS

Patent Abstracts of Japan vol. 7, No. 233 (E–204) [1378], Oct. 15, 1983 & JP, A, 58 121802 (Matsushita Denki Sangyo KK), Jul. 20, 1983, see abstract.

Nachrichtentechnische Zeitschrift N.T.Z., vol. 36, No. 12, Dec. 1983, Berlin, Germany, pp. 806–808, XP002019332 Hausszmann Wolfgang: "Ein Digitaler Demodulator fur Equidistant Abgetastet FM–Signal".

Primary Examiner—Dinh T. Le
Attorney, Agent, or Firm—Nixon & Vanderhye P.C.

[57] ABSTRACT

In a bandpass filter, a first cyclical analogue signal V3 at a center frequency divided by integer N in divide 44 and the divided signal supplied to a digital filter 48 as its system clock; a second cyclical analogue signal at a frequency, to be measured, differing by a small amount from the center frequency, is delayed by N cycles by a dynamic store 54; a substractor 56 subtracts the second signal from the delayed second signal and supplies any difference to the digital filter 48; the output of the digital filter is related to the frequency of the second signal, but the center frequency is suppressed. The filter may be used in an interrogation for an electronic detection system in which an interrogation signal is modified in frequency by a small amount, characteristic of a device to be detected.

7 Claims, 3 Drawing Sheets

DIGITAL FILTER

This is a continuation of PTC application PCT/GB96/01871, filed Jul. 31, 1996.

FIELD OF THE INVENTION

This invention relates to digital filters and more particularly to a interrogator circuit.

BACKGROUND AND SUMMARY OF THE INVENTION

This invention relates to a frequency detection system, especially a system capable of measuring frequency shift in a signal which may have undergone a phase shift.

One example of the application of such a detection system is in an electronic identification system comprising an interrogator and one or more non-contact transponders. A signal at a first frequency is radiated by the interrogator, and the non-contact transponder returns in response a second signal at a slightly different frequency; the frequency difference may be small in magnitude and must be measured very accurately. The frequency difference identifies a particular transponder.

In some electronic identification systems, for example a system used to control a locked door, or in a supermarket check-out to allow automatic billing of selected goods, the distance between the interrogator and the transponder can be controlled, and the system designed to operate accordingly. Often the transponders are arranged to alter the Q factor of the system in a manner characteristic of each transponder, and the change in Q factor is measured. Often the change in Q factor is effected by shorting a coil in the transponder, and such a system is described in our co-pending UK Patent Application No. 9505350.0 filed on 16th Mar. 1995.

If however the distance between the transponder and the interrogator is increased, then the influence of a shorted coil may be too small to give a significant change in Q factor. To increase the operational distance of the system, a high frequency back-signalling arrangement is required, as set out in our UK Patent Applications 9508600.5 filed on the 27th Apr. 1995 and 9511085.4 filed on the 1st Jun. 1995.

A disadvantage of the arrangement set out in these applications is that the transponder requires an increased energy level which may not be supplied easily.

It is a first object of the invention to provide a frequency detection system based on a digital filter having a novel input arrangement.

It is a second object of the invention to provide an electrical identification system, based on a shorted-coil transponder system, and capable of operating over substantial distances without the need for a high power source.

According to the invention a bandpass filter comprises:

first supply means to supply a first cyclical analogue signal at a centre frequency $f_1$;

divider means to divide the centre frequency by an integer N and supply the frequency divided signal to a digital filter as the system clock of said digital filter;

second supply means to supply a second cyclical analogue signal at a frequency to be measured $f_2$ which differs from the centre frequency by a small amount;

delay means to delay the second signal by N cycles;

subtraction means to receive the current second signal $S_c$ and the delayed second signal $S_p$ and to provide any difference to the digital filter as a difference signal;

whereby the digital filter provides an output signal in which the centre frequency is suppressed and which is related to the frequency of the second signal.

The delay means typically comprises a dynamic store, and the integer N is typically 20.

Also according to the invention an interrogator for an electronic detection system comprises a first oscillator arranged to transmit a cyclical analogue interrogation signal at a centre frequency;

antenna means to receive a second signal at a frequency differing by a small amount from the centre frequency;

delay means to delay the second signal by N cycles where N is an integer;

subtraction means to receive the second signal and the delayed second signal and to provide any difference as a difference signal to a digital filter; and frequency division means to divide the centre frequency signal by an integer N and supply the divided frequency to the digital filter as the system clock of said digital filter;

whereby the output of the digital filter has the centre frequency suppressed and is related to the frequency of the second signal.

Optionally the divider means is a phase-locked loop comprising a phase discriminator supplied by the first oscillator, a voltage controlled oscillator, and a divide unit.

BRIEF DESCRIPTION OF THE FIGURES

The invention will now be described by way of example only with reference to the accompanying drawings in which.

DETAILED DESCRIPTION OF THE PRESENTLY PREFERRED EMBODIMENT

Figure 1:
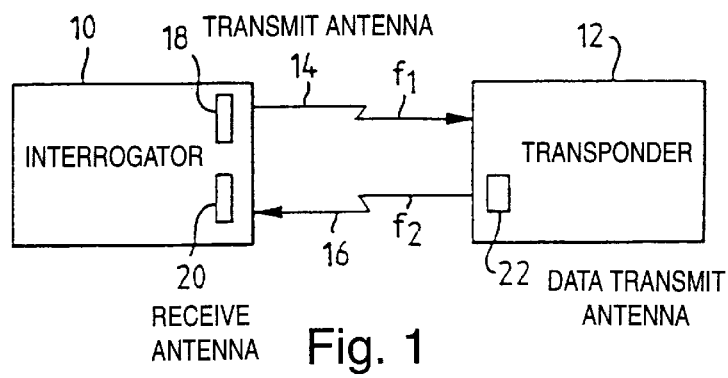
FIG. 1 is illustrates in principle an electronic identification circuit.

In FIG. 1 an electronic identification circuit comprises an interrogator 10 and a passive transponder 12. The interrogator transmits power to the transponder, as indicated at 14, for example at frequency $f_1$=150 to 256 kHz, and the transponder utilises the power to operate the circuit, and to reply With an identification signal 16, modulated in amplitude, frequency or phase by known techniques. For example the transponder modifies the frequency of the signal by changing the total Q factor of the system to frequency $f_2$. The interrogator 10 has a transmit antenna 18 and a receive antenna 20.

As disclosed in our co-pending Patent Application No. 9505350.0 filed on 16th Mar. 1995, the transponder 12 has a data transmit antenna 22 which is modulated by shorting of its coil, so that the Q factor of the interrogator-transponder system varies. The construction of the antenna is such that the Q factor is broad and flat, so that detection of a small frequency change cannot be achieved by, known techniques.

Figure 2:
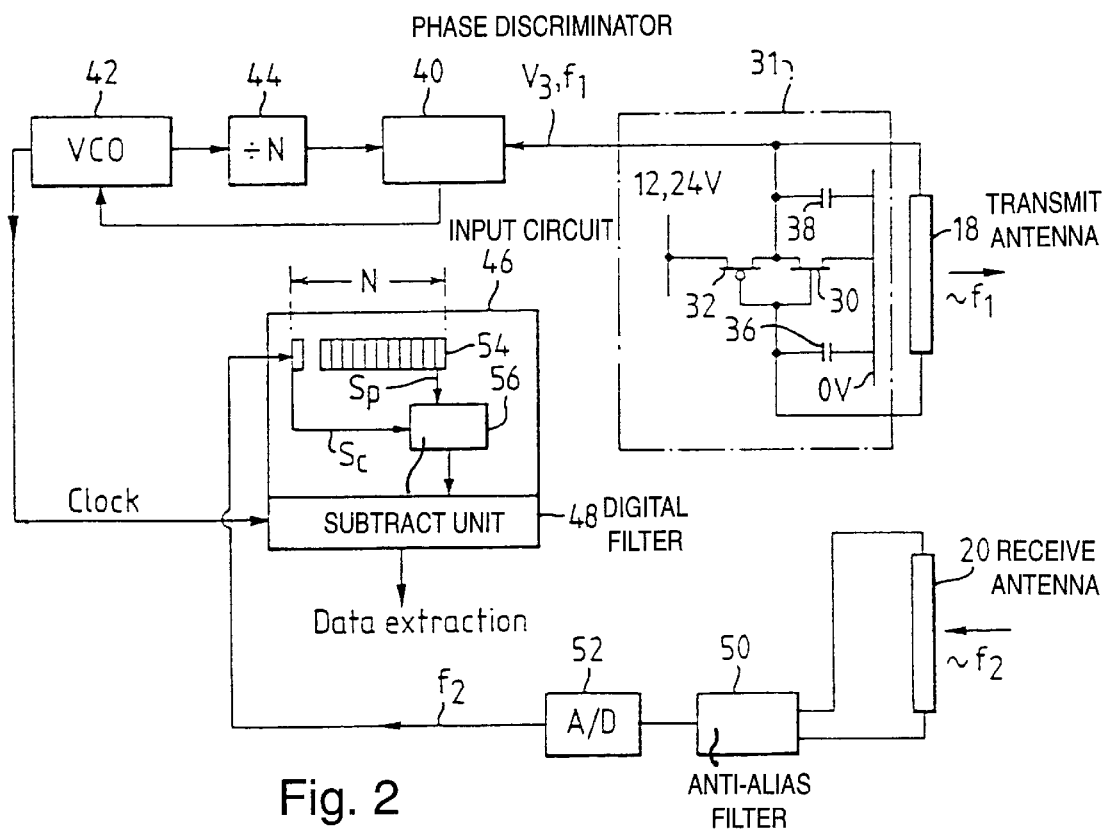
FIG. 2 illustrates in partial block diagram form an interrogator according to the invention.

FIG. 2 illustrates an interrogator circuit capable of detecting a small frequency change in such circumstances and incorporating a bandpass filter according to the present invention. The primary coil of the transmit antenna 18 of the interrogator 10 is connected across an inverter circuit comprising two MOSFET transistors 30,32 and each end of the coil 18 is also connected respectively to one of two capacitors 36,38. The circuit constitutes a Colpitts oscillator indicated by reference 31, and the values are chosen so that, contrary to conventional design principles, the oscillator is unstable. The inverter circuit has a large drive capability and therefore a large energy transmission.

A signal representing oscillator output, which is referenced V3 $f_1$ in FIG. 2, is connected to a phase discriminator 40 the output of which is connected to a voltage controlled oscillator VCO 42. The VCO 42 is connected to a divider 44 which provides the second input to the phase discriminator 40, and also to a digital filter 48. The filter 48 has high internal precision; it may be an IEEE 32-bit floating point filter.

The interrogator receive antenna 20 is connected across an anti-alias filter 50 whose output is connected through A/D converter 52 to the input circuit 46 of the filter 48, providing a signal at frequency $f_2$.

Figure 3A:
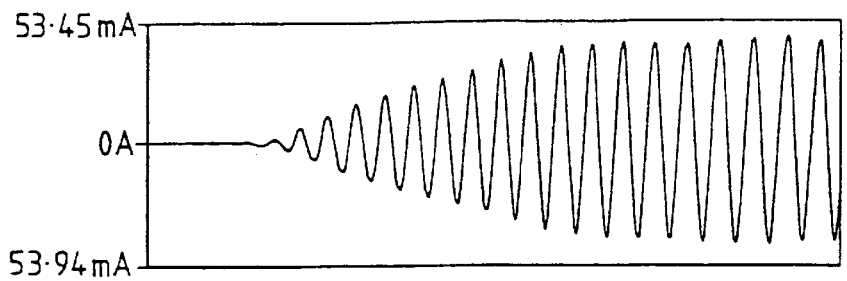
FIGS. 3a and 3b illustrate changes in current and voltage of the interrogator's antenna.
Figure 3B:
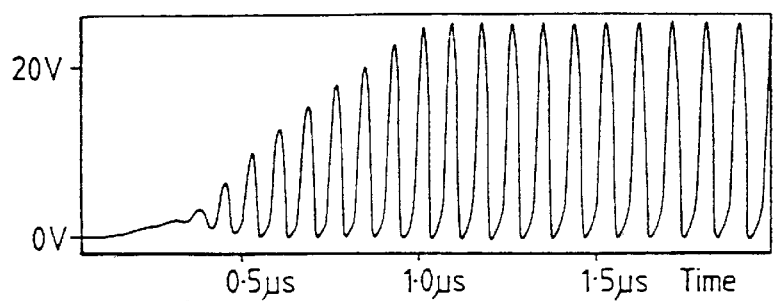

FIGS. 3a and 3b are, respectively, plots of current through and voltage across the primary coil of antenna 18 on start-up of the circuit; it will be seen that a standard frequency is quickly reached, and currents may be as high as ±50 milliamps.

The VCO 42 generates a frequency which is eight times the frequency of signal V3 from the Colpitts oscillator and supplies it to the digital filter 48 as a clock signal. The divider 44 divides this frequency by N for supply to the phase discriminator 40, as indicated at reference V5.

The phase discriminator 40 and VCO 42 form a phase-locked loop. On start-up of the Colpitts oscillator 31, the VCO quickly reaches and is then locked to the same frequency.

Figure 4A:
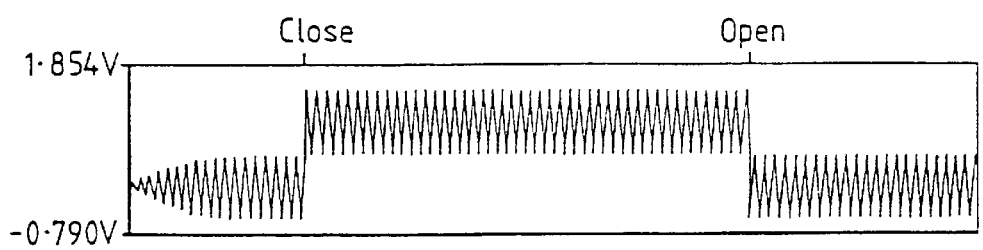
FIGS. 4a and 4b illustrate respectively the voltage and frequency output of the Colpitts oscillator.

Suppose now that the transponder 12 is modulated to change the Q factor of the system. The modulation is caused by closing and opening a switch in the transponder 12 to short a part of its coil 22, and the effect is illustrated in FIG. 4a which shows the voltage across the coil of the receive antenna 20; as the switch is closed, the peak-to-peak voltage is unchanged, although the absolute signal magnitude chances; this is in marked contrast to prior art interrogator circuits which detect an absorption of energy and therefore suffer a considerable change in peak-to-peak signals. The effect of one switch closure and opening is shown i.e. one data bit of the transponder.

Figure 4B:
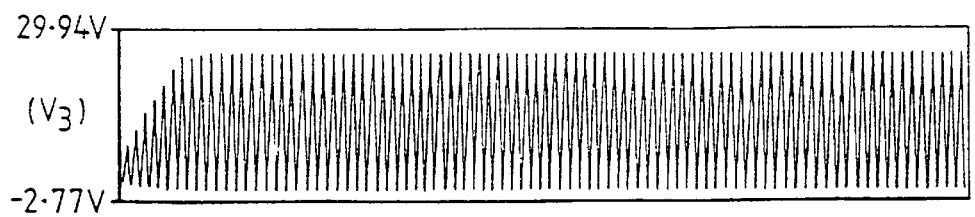

FIG. 4b shows the output of a Colpitts oscillator; because it has been made unstable, its frequency follows the frequency transmitted by the transponder antenna 18 and received by the receive antenna 20; there is in fact a small change in frequency, not easily visible in this figure.

The VCO 42 typically comprises a capacitor and current injector, and, having no coil is not sensitive to changes in frequency of the signal received from the transponder 10. The VCO operating frequency changes only through the phase-locked loop.

The input circuit 46 comprises a dynamic storage unit 54 and a subtract unit 56 whose output is supplied to the filter 48. The dynamic storage unit 54 supplies to the subtract unit 56 both the current value ($S_c$) of the signal supplied by the A/D converter 52, and also the delayed value ($S_p$) of that signal that had occurred N cycles previously, where N is the integral associated with the divider 44. Typically N is 20.

Figure 5:
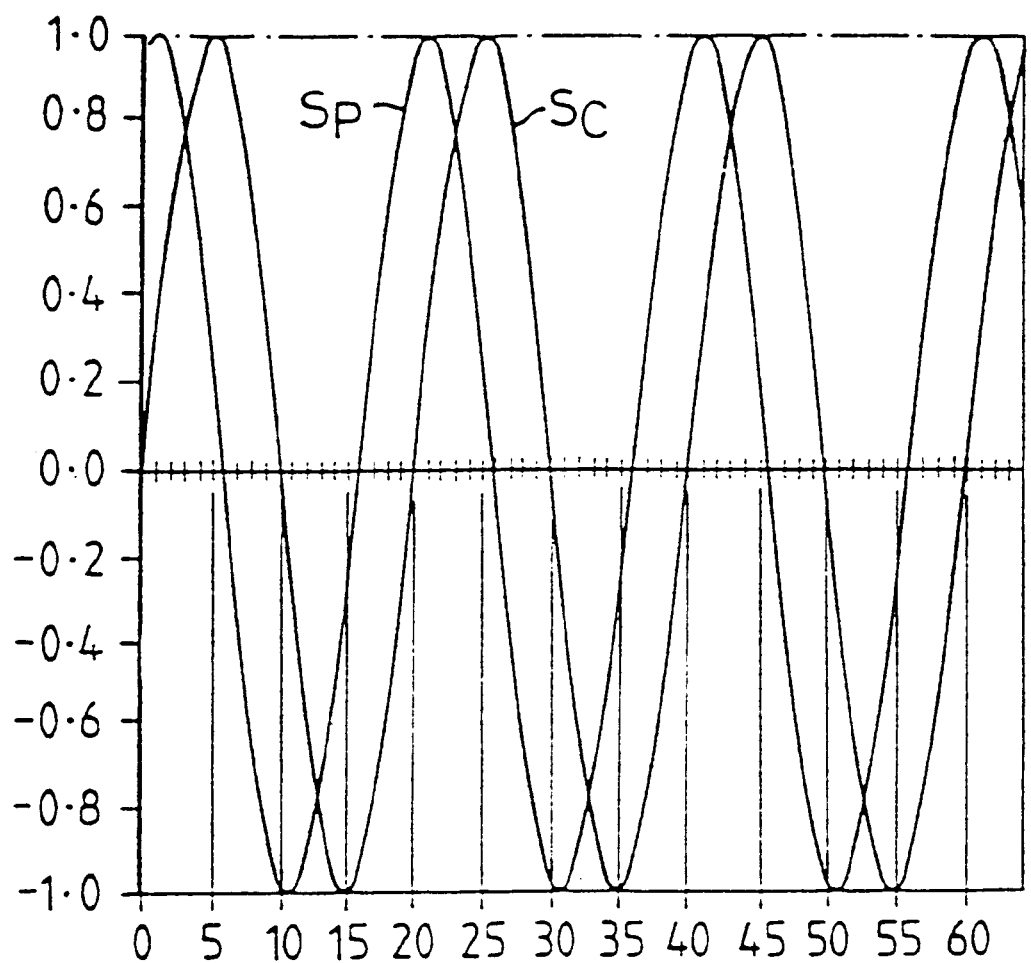
FIG. 5 illustrates the current and previous signals supplied to the subtraction device.

The effect is to provide a bandpass filter, centred on the frequency of the signals $S_P$ and $S_c$; this effect is illustrated in FIG. 5. The two signals $S_P$ and $S_c$ are identical in frequency but differ in phase. Since a division by 20 has been applied by the divider 44 to the filter clock signal, the signal cycle is repeated every 20 samples. The vector values of the current and previous signals $S_P$, $S_c$ for each pair of samples are given in Table 1.

TABLE 1

| Sample | Signal $S_c$ | Signal Sp |
|---|---|---|
| 0 | 0.00 | 0.96 |
| 1 | 0.31 | 1.00 |
| 2 | 0.59 | 0.94 |
| 3 | 0.81 | 0.78 |
| 4 | 0.95 | 0.55 |
| 5 | 1.00 | 0.27 |
| 6 | 0.95 | −0.04 |
| 7 | 0.81 | −0.35 |
| 8 | 0.59 | −0.62 |
| 9 | 0.31 | −0.83 |
| 10 | 0.00 | −0.96 |
| 11 | −0.31 | −1.00 |
| 12 | −0.59 | −0.94 |
| 13 | −0.81 | −0.78 |
| 14 | −0.95 | −0.55 |
| 15 | −1.00 | −0.27 |
| 16 | −0.95 | 0.04 |
| 17 | −0.81 | 0.35 |
| 18 | −0.59 | 0.62 |
| 19 | −0.31 | 0.83 |
| 20 | 0.00 | 0.96 |
| 21 | 0.31 | 1.00 |
| 22 | 0.59 | 0.94 |
| 23 | 0.81 | 0.78 |
| 24 | 0.95 | 0.55 |
| 25 | 1.00 | 0.27 |

It can be seen that the signal relationship is repeated every 20 cycles, so if the subtractor subtracts a signal delayed by a time corresponding to 20 cycles from the undelayed signal, the result is zero. This applies no matter which pair of delayed and undelayed signals are subtracted, and no matter which part of the cyclical signal is used.

If the signal received from the antenna 20 is identical in frequency to that radiated by antenna 18, the output of the subtract unit 56 is zero. In effect, this frequency has been suppressed.

Suppose however the transponder 12 sends its characteristic signal, which differs slightly in frequency from the interrogation signal. The signals $S_P$ and $S_c$ now slowly drift apart, and the subtract unit signal every 20 samples is non-zero; this signal is supplied to the digital filter 48, which outputs a signal indicating the frequency received by antenna 20, i.e. the frequency associated with the particular transponder, but with suppression of the radiated frequency. The output of the digital filter 48 can be connected to conventional signal analysis means (not shown) to indicate the identity of the transponder. For example, if the system is used in a supermarket check-out the identity signal may be the related price of an article to which the transponder is attached.

To permit identification of a second transponder, the circuit must be reset by conventional means (not shown). The Colpitts oscillator 31 and the VCO 42 lock once more to a transmitted interrogation frequency, and the interrogation, reception and identification process is repeated.

In practice the loop filter in the discriminator is disconnected at the same time as an interrogation signal is emitted by the antenna 18. The frequency measurement is made, and the loop filter is reconnected, thus resetting the system.

During a measurement of frequency, the VCO 42 remains locked to the original frequency of the Colpitts oscillator 31.

The frequency of the unstable Colpitts oscillator may in fact change, but the VCO 42 continues to supply a clock signal to the digital filter 48 at the original divider frequency.

In effect, the frequency component of the VCO oscillator is used and the phase of the signal does not affect the behaviour of the digital filter.

The electronic identification according to the invention allows rapid identification of a large number of different transponders. When applied to a check-out of a supermarket, an entire trolley load of goods may be identified in a relatively short time In a second application of a bandpass filter according to the invention, the signal emitted by antenna 18 is a radar signal operating on the Doppler principle, for example in a known design of burglar alarm system. Such radars often operate at 120 kHz, and an analogue to digital converter is too slow in operation for detection of a reflected radar signal. A bandpass filter according to the invention is ideal for such an application. The apparatus described in detail above can be directly applicable, with adjustment to operate at appropriate frequencies.

I claim:

1. A frequency detection circuit comprising:
   a first node to receive a first cyclical analogue signal at a first frequency ($f_1$);
   frequency converter means to receive the first cyclical analogue signal, to convert the first signal to a converted frequency signal, and to supply the converted frequency signal to a digital filter (48) as a system clock signal for said filter;
   a second node to receive a second cyclical analogue signal at a second frequency ($f_2$) which differs from the first frequency by a small amount;
   a delay circuit to delay the second signal by N cycles; and
   a subtractor to receive a current value of the second cyclical analogue signal ($S_c$) from the second node and a delayed value of the second cyclical analog signal ($S_p$) from the delay circuit, to subtract them and to provide any difference to the digital filter as a difference signal, whereby the digital filter provides an output signal comprising the second frequency ($f_2$) and substantially suppressing any signal at the first frequency ($f_1$).

2. A detection circuit according to claim 1 in which the delay circuit comprises a dynamic storage unit.

3. A detection circuit according to claim 1 wherein N is 20.

4. A circuit according to claim 2 wherein N is 20.

5. An interrogator for an electronic detection system characterised by comprising:
   a first oscillator arranged to transmit a first signal at a first frequency;
   antenna means to receive a second signal at a second frequency differing by a small amount from the first frequency;
   delaying means to delay the second signal by N cycles where N is an integer;
   subtraction means to receive from the antenna means the second signal and from the delay means a delay of the second signal, to subtract the received second signal and the delayed second signal, and to provide any difference therebetween as a difference signal to a digital filter;
   frequency converter means to convert the first frequency into a converted frequency signal and to supply the converted frequency signal to the digital filter as a system clock for said filter;
   whereby the output of the digital filter identifies a presence of the second signal at the second frequency and substantially suppresses any signal at the first frequency.

6. An interrogator according to claim 5 wherein the means to divide comprises a phase-locked loop comprising a phase discriminator coupled to the first oscillator, a voltage controlled oscillator and a divider unit.

7. A circuit for interrogating an input signal at a second frequency originating as a result of an interrogation signal at a first frequency differing from the second frequency by a small amount, comprising:
   a transmitter to emit the interrogation signal at the first frequency,
   a receiver to receive the input signal at the second frequency,
   a phase lock loop converting said input signal into an oscillation signal at a third frequency,
   a node to receive a digitized version of the input signal from the receiver,
   a delaying circuit to receive from the node the digitized version of the input signal and to output a delayed input signal equal to the digitized version of the input signal delayed by N cycles,
   a subtractor having two inputs to receive, respectively, the digitized version of the input signal and the delayed input signal, to subtract them, and to output a resultant difference signal, and
   a digital filter receiving the difference signal and said oscillation signal and producing an output signal comprising the second frequency ($f_2$) and substantially suppressing any signal at the first frequency ($f_1$).

* * * * *